US 6,747,871 B2

(12) United States Patent
Jeudi

(10) Patent No.: US 6,747,871 B2
(45) Date of Patent: Jun. 8, 2004

(54) ELECTRONIC EQUIPMENT ASSEMBLY

(75) Inventor: Jean-Marie Jeudi, Avressieux (FR)

(73) Assignee: Hewlett-Packard Development Copany, L.P., Houston, TX (US)

( * ) Notice: Subject to any disclaimer, the term of this patent is extended or adjusted under 35 U.S.C. 154(b) by 0 days.

(21) Appl. No.: 10/143,329

(22) Filed: May 10, 2002

(65) Prior Publication Data

US 2002/0181202 A1 Dec. 5, 2002

(30) Foreign Application Priority Data

May 10, 2001 (EP) .............................. 01410046

(51) Int. Cl.⁷ ................................................ H05H 7/20
(52) U.S. Cl. ...................... 361/695; 307/150; 454/184; 361/735; 361/744
(58) Field of Search .......................... 307/150; 361/683, 361/687, 694–695, 735, 744; 174/16.1; 454/184; 62/259.2

(56) References Cited

U.S. PATENT DOCUMENTS

| | | | |
|---|---|---|---|
| 4,383,286 A | * 5/1983 | Hicks | ......................... 361/695 |
| 5,067,040 A | 11/1991 | Fallik | |
| 5,319,520 A | 6/1994 | Sugiyama et al. | |
| 5,335,144 A | * 8/1994 | Maroushek | ................. 361/695 |
| 5,510,954 A | 4/1996 | Wyler | |
| 5,691,883 A | 11/1997 | Nelson | |
| 5,993,241 A | 11/1999 | Olson et al. | |

FOREIGN PATENT DOCUMENTS

| | | |
|---|---|---|
| EP | 0 578 394 A2 | 1/1994 |
| JP | 2000294968 | 10/2000 |

* cited by examiner

Primary Examiner—Gregory D. Thompson

(57) ABSTRACT

The present invention relates to an electronic assembly and, more particularly, to a computing assembly comprising a computing platform and an external power supply. The computing platform has an internal cooling mechanism which generates an externally directed flow of air. The external power supply is disposed relative to the cooling mechanism such that the outwardly directed flow of air, or at least a portion thereof, passes through the power supply and exerts a cooling influence on the external power supply.

17 Claims, 4 Drawing Sheets

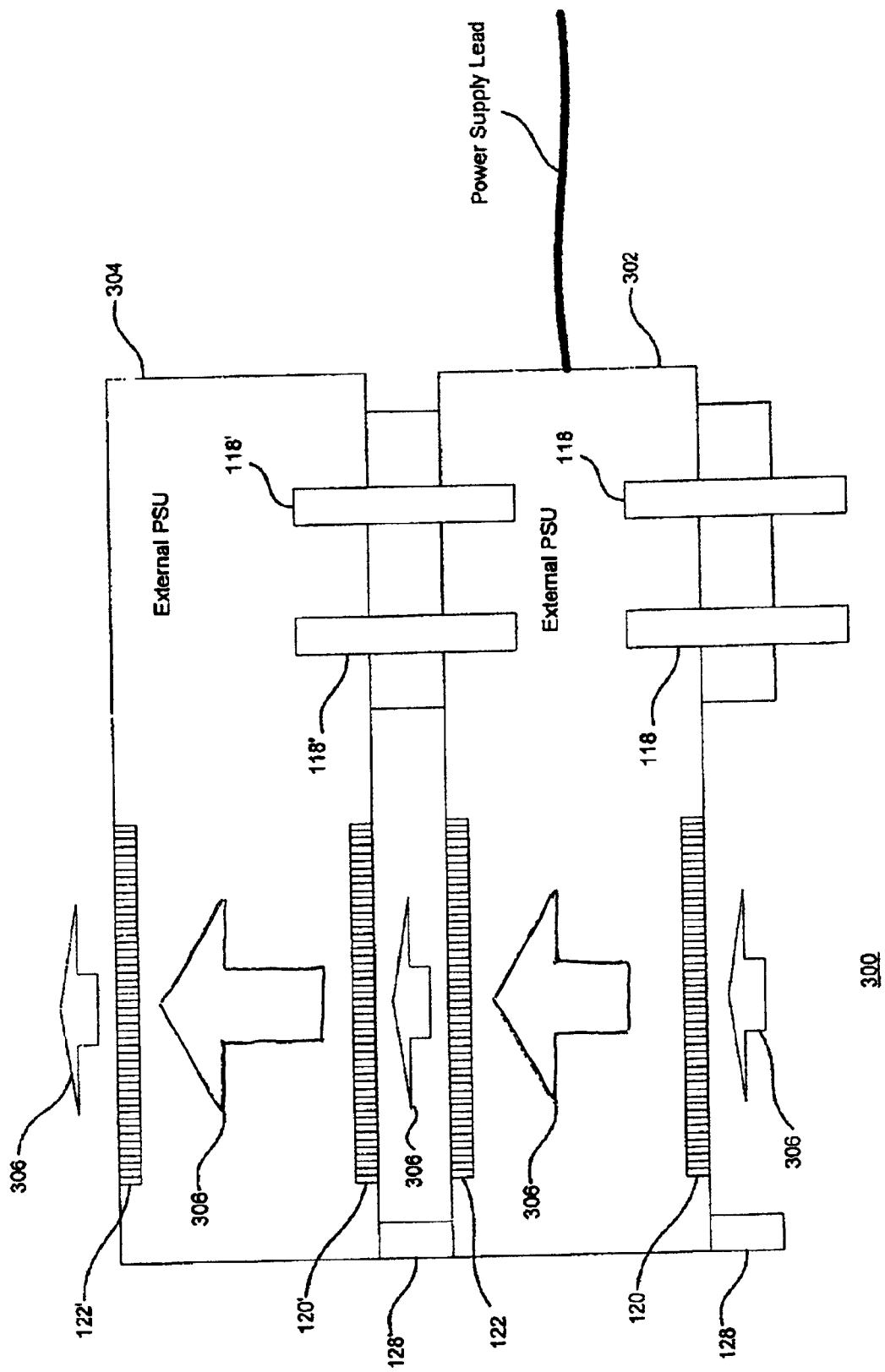

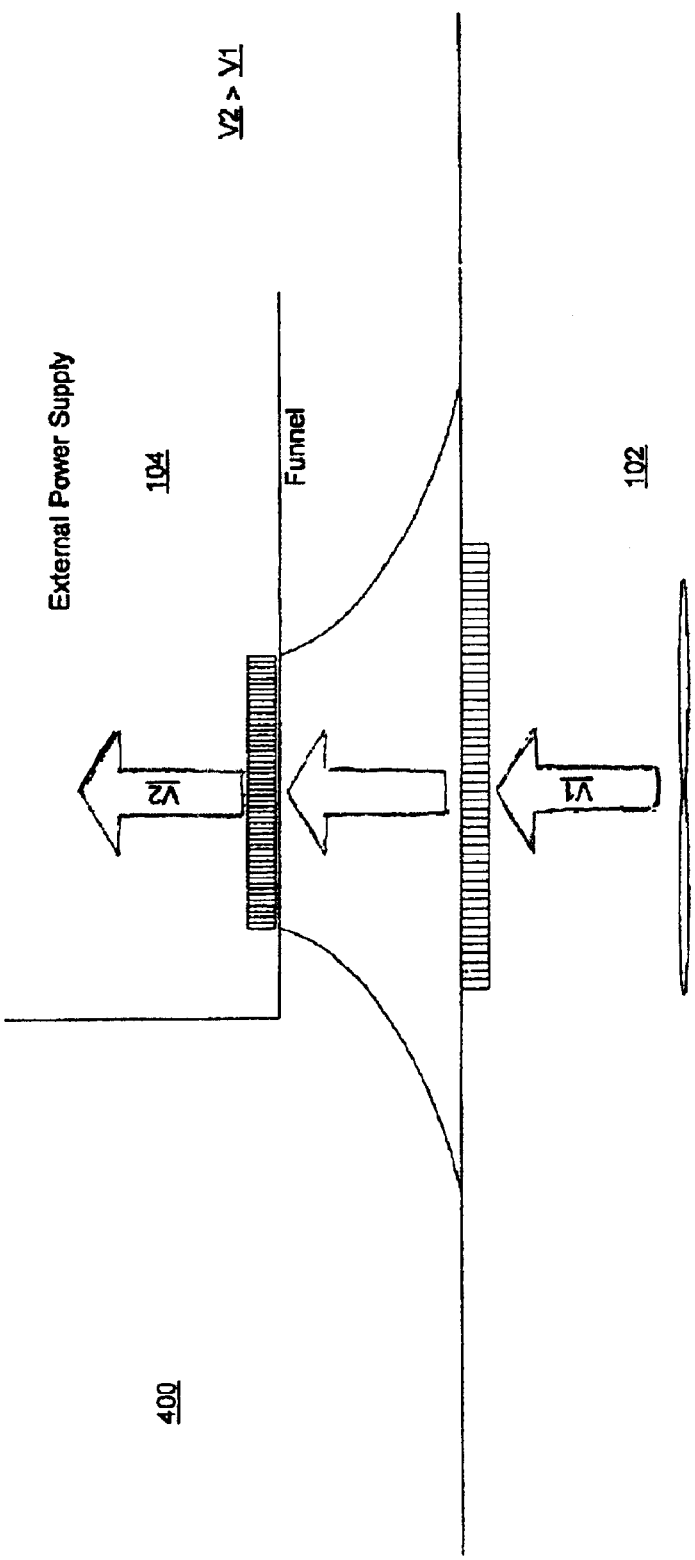

ELECTRONIC EQUIPMENT ASSEMBLY

FIELD OF THE INVENTION

The present invention relates to an electronic equipment assembly and, more particularly, to a computer system such as, for example, a desk top computer system.

BACKGROUND OF THE INVENTION

The ubiquitous nature of the Internet, together with associated services, and the increased efficacy of performing tasks using computers over the past decade is such that the use of computers is an every day occurrence for much of the world's population. While improvements have been, and continue to be, made at the man-machine interface level to increase the ease of use of computers, the computer systems themselves have become increasingly complex internally.

A major source of complexity, and also of much unreliability, in known systems is the expandability and upgrade capability of the systems. In effect, the configuration of the system can be changed by adding or upgrading various components. Consequently, a standard computer platform received by a user has to be designed so that it will work reliably with all upgrades a user may possibly choose to install.

A manufacturer of a computer system typically supplies warranties with that computer system and undertakes to supply, in many instances on site, maintenance services in the event of a malfunction of any part of the computer system. The provision of maintenance services for such complex computer systems is both time consuming and represents a significant financial burden for the manufacturer to bare. Furthermore, and more importantly, a computer system maybe inoperable until the maintenance has been effected which represents a significant inconvenience to the user of the computer system. Accordingly, research and development efforts relating to computer systems have, over recent years, been directed to changing the nature of the desk top computer, at least for some applications, from being a relatively complex but flexible assembly of inter-operating components, such as a processor, memory, sound subsystem, CD-ROM drive, network card etc., each having distinct functions, parameters and features, to a single, network-connected and relatively simple and reliable appliance, more akin to a telephone or television set than a microcomputer, whose internal make-up and functioning is both invisible and irrelevant to the user.

These simpler platforms have been arranged to realise or to facilitate the ease of provision of maintenance and support services and to reduce the inconvenience experienced by the user when it is necessary to provide such maintenance and support services. For example, the computer system may be supplied with an external power supply, as is the case with most portable or laptop computers, such that, in the event of the failure of the power supply, that power supply can be replaced by the user without the user having to undertake any activities such as removing a system housing or cover, disconnecting a failed power supply from the interior of the computer and connecting a new power supply in its place. However, the warranties associated with the supply of a computer system often preclude the user from giving effect to maintenance which involves opening the housing of the computer system.

Clearly such a simpler computer system in the example given, does not require any significant technical knowledge to be able to effect a repair in relation to the computer system. Additional developments also include, for example, a greatly simplified computing platform having a removable, non-volatile, storage medium upon which all necessary local applications, for example, the operating and networking software, and data are stored. In the event of the failure of some aspect of the computer platform other than the storage medium, the storage medium is arranged to be readily removable from the computer platform and capable of being inserted, in a relatively simple manner, into a replacement computing platform. In effect, the computing platform has become, from a user's or customer's perspective, an almost disposable article of manufacture.

Such a simplified computing platform is available from Hewlett Packard. For example, the E-PC represents an example of such a simplified PC.

However, as platform technology advances, it is often the case that the power supply requirements of platforms changes. Hence, currently designed power supplies are designed to have a relatively high rating. Accordingly, the power supplies typically used with such simplified computing platforms have a relatively large form factor which is dictated, at least in part, by the need to dissipate heat at a pre-determinable rate. The provision of such a relatively large form factor power supply is, from a user's and marketing perspective, undesirable. Furthermore, the typical flying leads associated with such power supplies, that is, the lead connecting the power supply to a power source and the lead connecting the power supply to the computing platform, represent further inconveniences for the user as well as a potential hazard. For example, the wires associated with the power supplies may represent a fire or an electrical risk. Hence, it can be appreciated there is a dichotomy within the art in that the power ratings for power supplies are increasing progressively and the form factors of such power supplies are required to be progressively decreasing.

One solution to the dichotomy is to manufacture external power supplies having a respective internal cooling mechanism to regulate the operating temperature of such a power supply. Such an arrangement would allow a reduction in the form factor of the power supply to be realised while concurrently facilitating an increase in the power supply rating. However, such power supplies typically are placed on the floor which results in detritus being introduced into the power supply. This, in turn, impedes the flow of air through the power supply. Furthermore, such an internal cooling mechanism for the power supply represents a source of undesirable acoustic noise.

It is an object of the present invention at least to mitigate the problems of the prior art.

SUMMARY OF INVENTION

Accordingly, a first aspect of the present invention provides an electronic equipment assembly comprising an electronic appliance and a first power supply having a housing containing a power regulator for supplying power to the electronic appliance; the electronic appliance having contained within a housing a circuit board bearing electrical components and a cooling mechanism arranged, in use, to generate a flow of air to regulate the temperature within the housing; the electronic appliance and power supply being mutually disposed such that the flow of air generated by the cooling mechanism influences the temperature of the first power supply.

Advantageously, the form factor of the external power supply can, for a given rating, be reduced as a consequence of the air flow generated by the cooling mechanism of the computing platform being used to influence, that is reduce, the operating temperature of the external power supply.

A second aspect of the present invention provides a method of cooling a power supplying within an electronic equipment assembly comprising an electronic appliance having contained within a housing a circuit board bearing electrical components and a cooling mechanism arranged, in use, to generate a flow of air to regulate the temperature within the housing; the method comprising the step of disposing the power supply and the electronic appliance such that, in use, the power supply is in the path of the flow of air thereby causing the cooling mechanism regulate the temperature of the power supply.

Preferably, the electronic appliance is a computing platform.

An embodiment provides a computing assembly in which the external power supply is connectable to the computing platform by at least one substantially rigid electrical conductor.

Advantageously, the need for the typical flying lead which, in the prior art, connects the power supply to the computing platform is obviated.

A preferred embodiment provides a computing assembly in which the operating temperature of the external power supply is monitored to provide an indication to the internal cooling mechanism of the computing platform of the current operating conditions of the external power supply and in which the internal cooling mechanism of the computing platform adjusts the rate of flow of the air flow in response to the signal providing an indication of the operating temperature of the external power supply.

An embodiment provides an external power supply for such a computing assembly.

An embodiment provides a computing platform for such a computing assembly.

Preferably, an embodiment provides an external power supply which generates a signal indicative of the quality of the power being supplied to the computing platform in response to which the computing platform can output an indication of whether or not the external power supply should be replaced or an indication of whether or not the external power supply is functioning correctly.

Preferably, the external power supply is disposed relative to the computing platform, in use, such that a predetermined distance is maintained between the computing platform and the external power supply in the direction of the air flow.

In an embodiment, the predetermined distance is realised using a stub which projects from at least one of the computing platform or the external power supply in the direction of the external power supply or computing platform respectively.

Preferably, the stub is arranged to engage positively a complementary formation on the external power supply or computing platform to result in a relatively secure coupling between the external power supply and the computing platform.

With reference to the substantially rigid power conductors for coupling power from the power supply to the computing platform, preferably the conductors project from the external power supply and are arranged to be received in complementary apertures of the computing platform.

Preferably, the computing platform comprises a sensor for detecting the correct coupling of the external power supply to the computing platform and, in response to detection of the correct coupling, transmits a signal to the external power supply to enable the latter to supply power to the computing platform at a given rating.

DESCRIPTION OF THE DRAWINGS

Embodiments of the present invention will now be described, by way of example only, with reference to the accompanying drawings in which:

FIG. 3 shows a stacked power supply arrangement; and

FIG. 4 depicts a funnel for coupling air flow from the internal cooling mechanism to the external power supply.

DESCRIPTION OF EMBODIMENTS OF THE INVENTION

Figure 1:
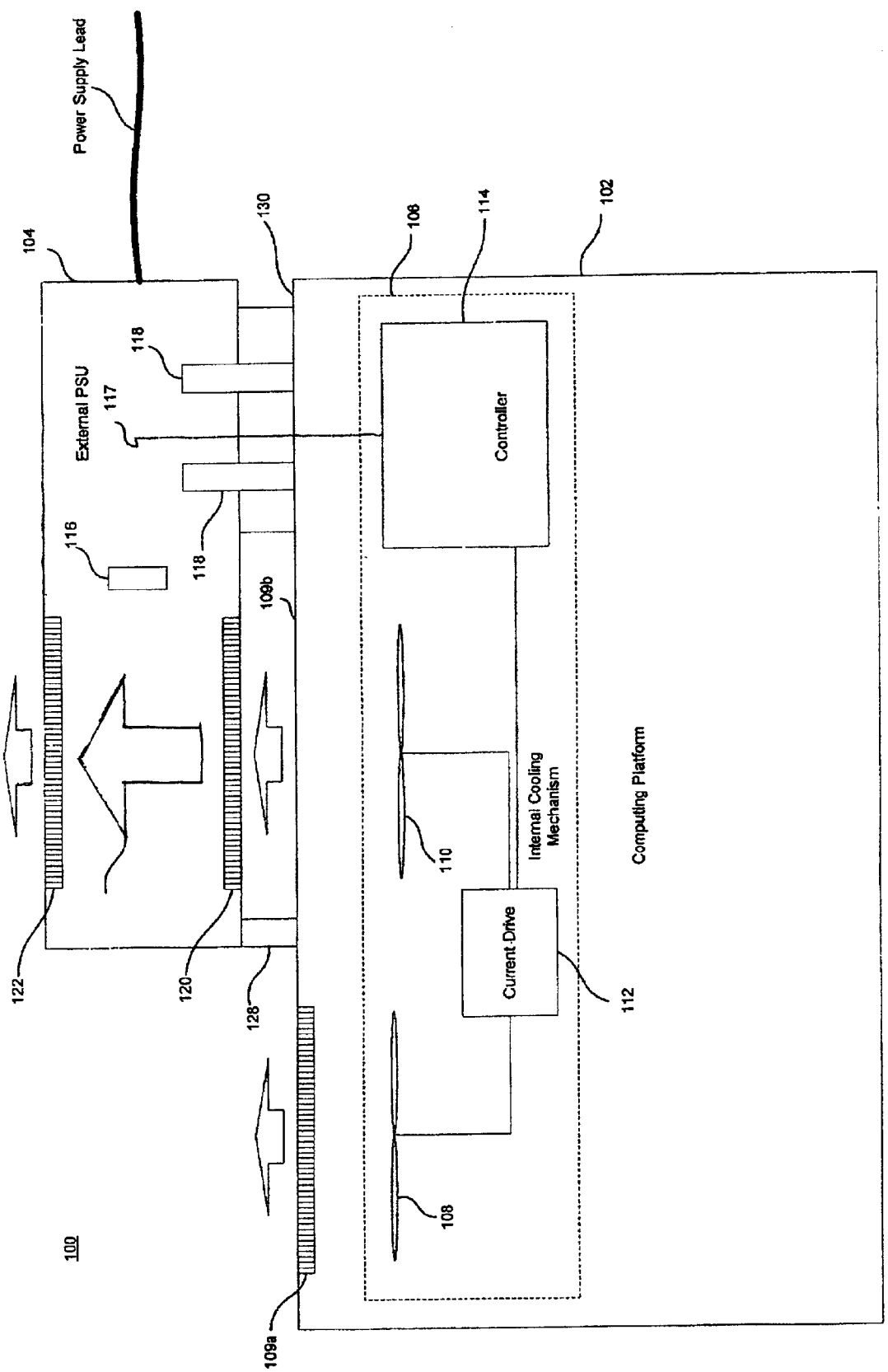
FIG. 1 shows a computing assembly according to an embodiment of the present invention.

Referring to FIG. 1 there is shown a computing assembly 100 comprising a computing platform 102 and an external power supply 104. The computing platform 102 comprises an internal cooling mechanism 106 which includes, in the illustrated example, at least one fan and preferably two fans 108 and 110. The fans are arranged to direct or generate a flow of air which flows outwardly, via vents 109a and 109b, from the computing platform 102 in a direction other than towards a user (not shown) of the computing platform. The internal cooling mechanism 106 an associated drive 112 that is responsive to a signal received from a drive controller 114. The drive controller 114 generates a signal indicative of the volume of airflow or rate of airflow required to be generated by the fans 108 and 110 to maintain a desired operating temperature.

Preferably, the external power supply 104 contains a temperature sensor 116 for determining the current operating temperature of the external power supply 104. The temperature sensor 116 supplies a signal to the drive controller 114 via a suitable communication link 117. The drive controller 114 determines whether or not the rate of flow or volume of air flow generated by the fans 108 and 110 should be increased or decreased according to the current operating temperature of the external power supply 104.

It can be appreciated that the external power supply 104 comprises at least one vent, and preferably two vents 120 and 122.

It can be appreciated that the external power supply 104 is disposed in the path of the air flow generated by the internal cooling mechanism 106. In particular, the airflow generated by fan 110 is arranged to pass, at least in part, through the first 120 and second 122 vents of the external power supply 104.

Preferably, the external power supply comprises a stub 128 which projects, in use, towards a rearwardly facing surface 130 of the computing platform 102. The stub 128 is arranged to maintain a predetermined distance between the rearwardly facing surface 130 of the computing platform 102 and the external power supply 104.

In a preferred embodiment, the stub 128 is arranged to engage a complementary formation (not shown) in the rearwardly facing surface 130 of the computing platform 102 so as to form a secure coupling therebetween. Preferably, the secure coupling is realised using a releasable snap fit arrangement between the stub 128 and the complementary formation.

Furthermore, the external power supply comprises at least one substantially rigid conductor for coupling power to the computing platform 102. The substantially rigid conductor has the benefit of allowing the flying lead typically found between prior art power supplies and computing platforms to be eliminated. Furthermore, the substantially rigid conductor may, in an embodiment, assist in maintaining a predetermined spatial relationship between the external power supply 104 and the computing platform 102.

Figure 2:
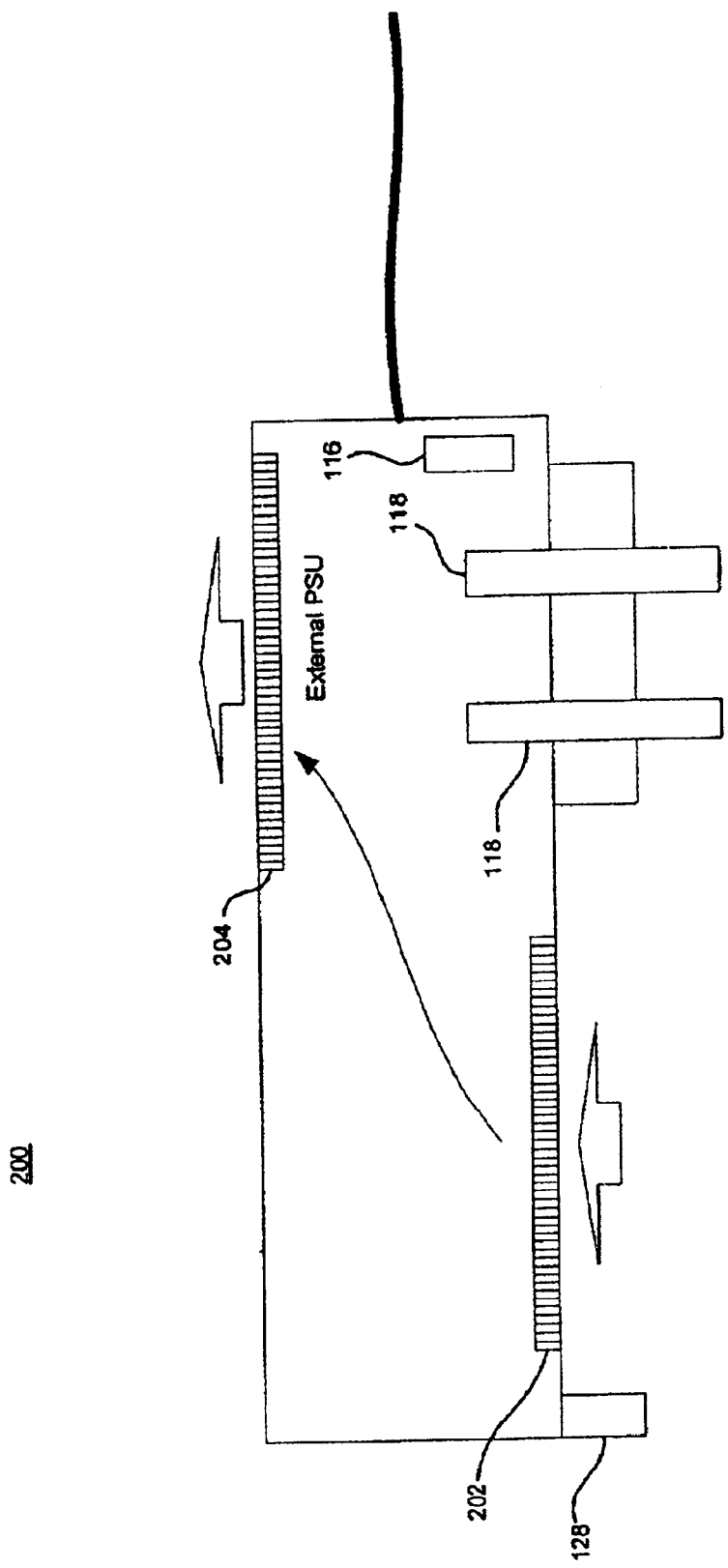
FIG. 2 illustrates a second embodiment of the external power supply.

FIG. 2 shows an alternative embodiment of the arrangement of vents 202 and 204 of the housing of an external power supply 200. It can be appreciated that the arrangement shown in FIG. 2 has the benefit that the air flow through the external power supply influences or flows across, to a greater degree or over a greater proportion of, the internal components of the power supply. In effect, this advantage is achieved by ensuring that the two vents 202 and 204 of the external power supply 200 are partially or wholly out of registry with one another.

Referring to FIG. 3, there is shown a piggyback arrangement 300 of a first 302 and a second 304 power supplies. The airflow 306 generated by the internal cooling mechanism 106 of the computing platform is arranged to pass through both the first 302 and second 304 external power supply. The advantage of such a piggy back arrangement 300 is that the power supply requirements of a higher rated computing platform can be accommodated without having to replace an existing external power supply. It can be appreciated that the air flow 306 passes through vents 120 and 122 of the first power supply 302 and then through vents 120' and 122' of the second power supply 304. The electrical conductors 118 and 118' of the first and second power supplies can be arranged to be connected in series or parallel.

Preferably, embodiments of the present invention utilise a funnel arranged to channel the airflow from the fans 108 and 110 of the internal cooling mechanism 106 into the external power supply 104 via the vent 120. An embodiment of such a funnel is shown schematically in FIG. 4. The funnel 400 is arranged to increase the velocity of the airflow emanating from the computing platform 102. Suitably, the cross sectional area of the funnel decreases with increasing proximity to the external power supply 104.

Preferably, an embodiment of the internal cooling mechanism 106 is arranged to detect, via appropriate sensors, at least one of the temperature of the piggy backed power supplies 302 and 304 and the presence of more than one power supply in such a piggy back arrangement 300. Suitably, the internal cooling mechanism 106 is arranged to increase the drive power supplied to the fans 108 and 110 to increase, in turn, the volume of air flowing through the piggy backed power supplies 302 and 304.

In some applications, it is desirable that the power supplied to the computing platform is uninterrupted. The use of an uninterruptable power supply unit to provide such an uninterruptable source of power is one option for solving this problem. However, according to an embodiment of the present invention, the piggy back arrangement 300 shown in FIG. 3 can be used to achieve substantially the same end by operating or drawing power from, for example, the first power supply 302 of the piggy back arrangement 300 and maintaining the second power supply 304 in a live standby mode. In the event of failure of the first power supply 302, the second power supply 304 can be arranged to detect such a failure and to assume the role of supplying power to the computing platform 102. It will be appreciated by those skilled in the art that the term "failure" encompasses complete failure and/or sags, surges or spikes generated by the failing power supply.

It will be appreciated that the funnel 400 in the above-described embodiments also acts to muffle the acoustic noise generated by the fan or fans 108 and/or 110.

Although the preferred embodiments have been described with reference to a computing assembly, it will be appreciated that the present invention is not limited thereto. Embodiments can equally well be realised in which any electronic appliance having an associated cooling mechanism and an external power supply are mutually disposed such that the external power supply is cooled via the internal cooling mechanism.

Furthermore, it will be appreciated that the cooling mechanism, in contrast to the above embodiments which expel air from the housing to cool the interior, can be arranged to draw air in through the vent to effect a change in internal temperature. Hence, the generated flow of air may be either inwardly or outwardly directed.

The above embodiments have been described with reference to the vents of the power supply being co-planar. It will be appreciated that embodiments can be realised in which the vents are not co-planar. Suitably, embodiments are envisaged in which the vents of the power supply are, for example, mutually orthogonal.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are incorporated herein as if individually set forth.

What is claimed is:

1. An electronic equipment assembly comprising an electronic appliance and a first power supply having a power supply housing containing a power regulator for supplying power to the electronic appliance; the electronic appliance having contained within an electronic appliance housing a circuit board bearing electrical components and a cooling mechanism arranged, in use, to generate a flow of air to regulate the temperature within the housing; the electronic appliance and the first power supply being mutually disposed such that the flow of air generated by the cooling mechanism influences the temperature of the first power supply, in which the housings of the electronic appliance and the first power supply comprise respective at least partially registered first vents such that the air flow leaves the electronic appliance housing and enters the power supply housing.

2. An electronic assembly as claimed in claim 1 in which the power supply housing comprises a second vent via which the air flow can exit from the power supply housing.

3. An electronic assembly as claimed in claim 2 in which the first and second vents of the power supply housing are at least partially out of registry.

4. An electronic assembly as claimed in claim 3 in which the first and second vents of the power supply housing are fully out of registry.

5. An electronic assembly as claimed in claim 1 in which the first power supply further comprises a temperature sensor for supplying to the cooling mechanism a signal related to the current temperature within the power supply housing; the cooling mechanism being arranged to vary the rate of flow of the air flow in response to the signal.

6. An electronic assembly as claimed in claim 1 in which the first power supply comprises conductors for coupling power to the electronic appliance.

7. An electronic assembly as claimed in claim 6 in which the conductors are substantially rigid stubs projecting from the power supply housing.

8. An electronic assembly as claimed in claim 7 in which the substantially rigid stubs are arranged to be received in complementary apertures of the electronic appliance.

9. An electronic assembly as claimed in claim 1 in which at least one of the power supply housing and electronic appliance housing comprises at least one projection arranged, in use, to maintain a predetermined spatial relationship between the first power supply and the electronic appliance.

10. An electronic assembly as claimed in claim 9 in which the at least one projection is arranged to be engaged releasably to at least one of the electronic appliance housing and the power supply housing.

11. An electronic assembly as claimed in claim 1 in which the power regulator of the first power supply is arranged to supply power at a selectable one of a plurality of power levels.

12. An electronic assembly as claimed in claim 1 in which the first power supply is arranged to bear a second power supply.

13. An electronic assembly as claimed in claim 12 in which the second power supply is operable as a stand-by power supply to supply power to the electronic appliance in the event of failure of the first power supply.

14. An electronic assembly as claimed in claim 12 in which the second power supply is operable to supply power to the electronic appliance substantially concurrently with the first power supply.

15. An electronic assembly as claimed in claim 1 in which the electronic appliance is a computing platform.

16. A method of cooling a power supply within an electronic equipment assembly comprising an electronic appliance having contained within a housing a circuit board bearing electrical components and a cooling mechanism arranged, in use, to generate a flow of air to regulate the temperature within the housing; the method comprising the step of disposing the power supply and the electronic appliance such that, in use, the power supply is in the path of the flow of air thereby causing the cooling mechanism regulate the temperature of the power supply, further comprising the step of arranging a power regulator of the power supply to supply power at a selectable one of a plurality of power levels.

17. An electronic equipment assembly comprising an electronic appliance and a first power supply having a power supply housing containing a power regulator for supplying power to the electronic appliance; the electronic appliance having contained within an electronic appliance housing a circuit board bearing electrical components and a cooling mechanism arranged, in use, to generate a flow of air to regulate the temperature within the housing; the electronic appliance and the first power supply being mutually disposed such that the flow of air generated by the cooling mechanism influences the temperature of the first power supply, wherein the first power supply is arranged to bear a second power supply.

* * * * *

UNITED STATES PATENT AND TRADEMARK OFFICE
CERTIFICATE OF CORRECTION

PATENT NO.     : 6,747,871 B2
DATED          : June 8, 2004
INVENTOR(S)    : Jean-Marie Jeudi It is certified that error appears in the above-identified patent and that said Letters Patent is hereby corrected as shown below:

Title page,
Item [73], Assignee, change "Hewlett-Packard Development Copany, L.P." to
-- Hewlett-Packard Development Company, L.P. --.

Signed and Sealed this

Thirtieth Day of August, 2005

JON W. DUDAS
*Director of the United States Patent and Trademark Office*